Jan. 3, 1933.   F. G. HUGHES   1,893,205
GAUGING APPARATUS
Filed Oct. 25, 1930   2 Sheets-Sheet 1
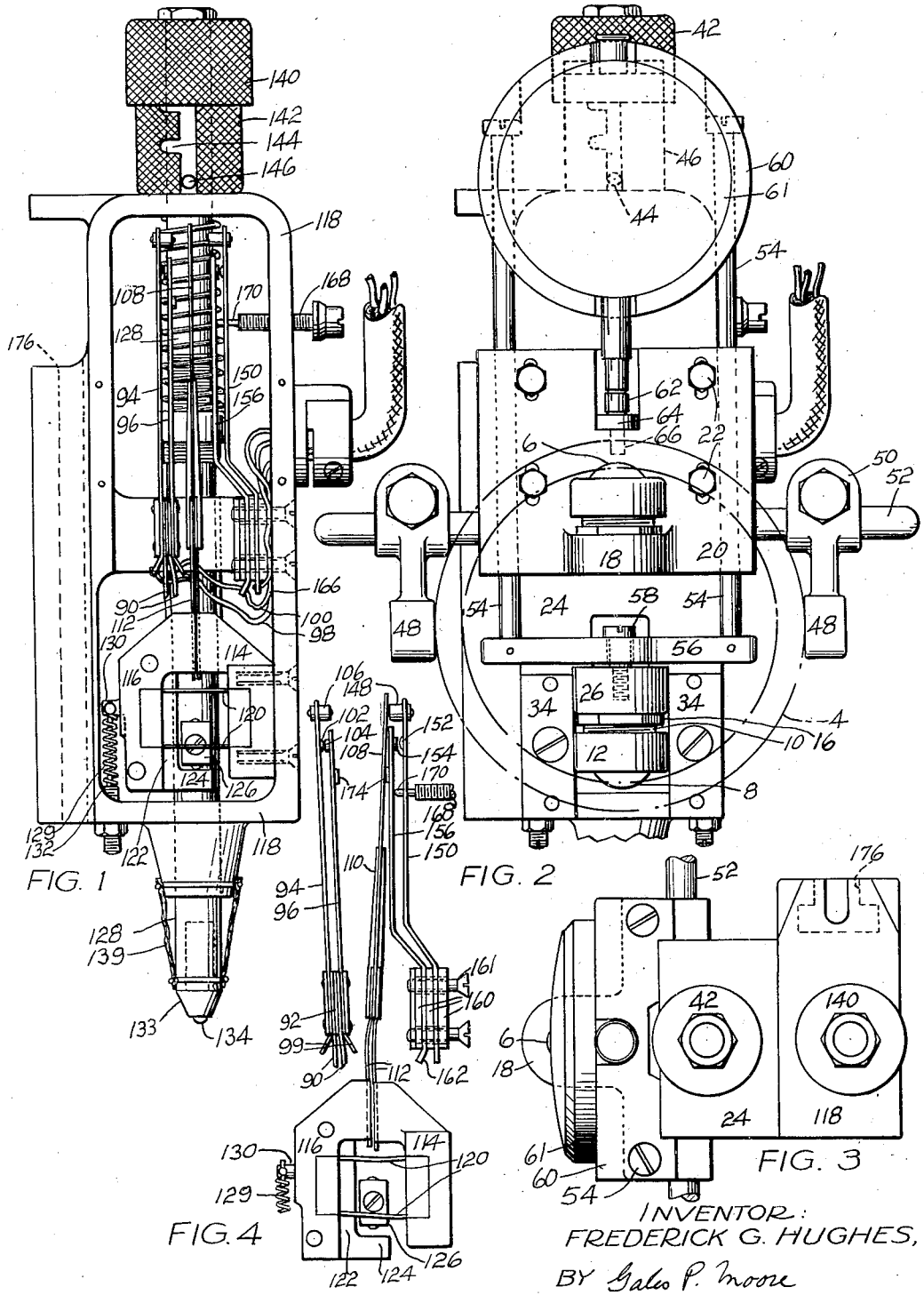
INVENTOR:
FREDERICK G. HUGHES,
BY Gales P. Moore
HIS ATTORNEY.

Jan. 3, 1933.  F. G. HUGHES  1,893,205
GAUGING APPARATUS
Filed Oct. 25, 1930  2 Sheets-Sheet 2
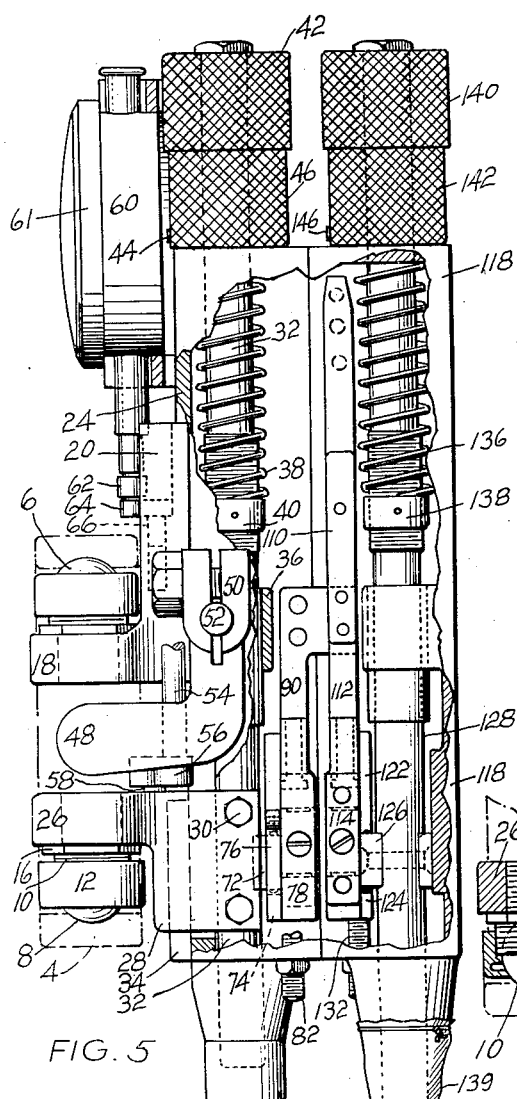
FIG. 5
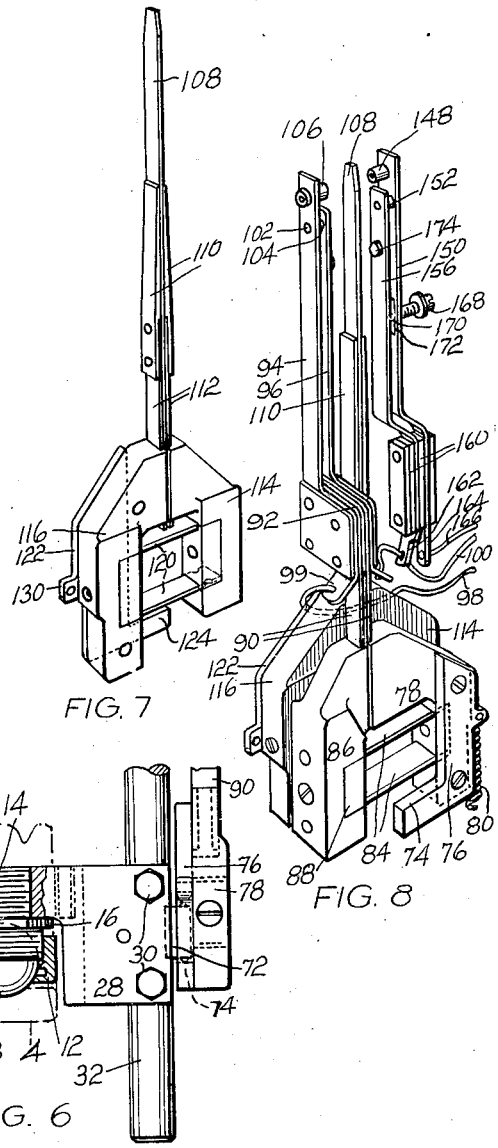
FIG. 7
FIG. 8
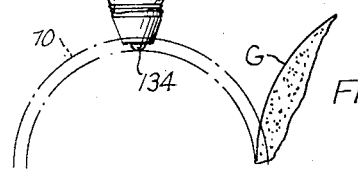
FIG. 6
INVENTOR:
FREDERICK G. HUGHES,
BY Gales P. Moore
HIS ATTORNEY Patented Jan. 3, 1933

1,893,205

UNITED STATES PATENT OFFICE

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

GAUGING APPARATUS

Application filed October 25, 1930. Serial No. 491,147.

This invention relates to gauging apparatus and comprises all the features of novelty herein disclosed. An object of the invention is to provide improved gauging means for controlling a sizing operation on a piece of work. Another object is to provide improved gauging apparatus for controlling a grinding operation on one of a pair of mating articles and wherein the size of one of the articles controls the size of its mate. Another object is to provide improved gauging apparatus for rings and the like. To these ends and to improve generally and in detail upon devices of this character, the invention also consists in the various matters hereinafter described and claimed.

In its broader aspects, the invention is not necessarily limited to the specific construction selected for illustration in the accompanying drawings in which Fig. 1 is a front elevation of mechanism associated with the rear section of the gauge casing.

Fig. 2 is a front elevation of the apparatus.

Fig. 3 is a plan view.

Fig. 4 is a front elevation of some of the mechanism of Fig. 1 in initial operative position.

Fig. 5 is a side elevation, partly broken away and in section, of the apparatus.

Fig. 6 is a fragmentary side view, partly broken away and in section.

Fig. 7 is a perspective view of certain elements in the rear casing section.

Fig. 8 is a perspective view of mechanism in both casing sections.

Inner and outer race rings of antifriction bearings have their raceways separately ground, each to an approximate predetermined size with the aid of a precision gauge which automatically stops the grinding operation. Due to errors in gauging, the outer race rings are not all of exactly the same size nor are the inner race rings and these errors have a cumulative effect when rolling elements are assembled between a pair of race rings. Cumulative errors may be minimized by matching outer race rings with inner race rings but this adds a subsequent gauging operation. According to the present invention, either the outer race rings or the inner race rings are ground, in the simplest way available, approximately to the desired finished size. Then each such finished race ring, whatever its size, is used in conjunction with gauge mechanism to control the grinding of its mating race ring. Although not necessarily limited to the measuring and sizing of such articles, the invention is herein described by reference to the grinding of a ball bearing cone under control of its mating and finished cup.

The broken lines in Figs. 2 and 5 indicate a bearing race ring or cup 4 whose raceway has been completely ground. The cup is held between balls 6 and 8 which are in contact with the raceway, one ball 6 being fixed and the other ball 8 being movable radially of the ring. Each ball is carried by a two part socket (Fig. 6) comprising an externally threaded body 10 and a collar or cap 12 which is threaded on the body and provided with an opening to let the ball project. The body also has a threaded stud 14 and a portion 16 which is polygonal to serve as a nut. The stud for the upper body is screwed to a lug 18 on a vertical plate 20 adjustably fastened by screw bolts 22 to a casing 24 and the stud for the lower body is screwed to a lug 26 projecting forwardly from a bracket 28 which is clamped by screw bolts 30 to a vertically slidable shaft 32. The bracket passes through the front wall of the casing and is guided by plates 34. The shaft slides through the upper and lower ends of the casing 24 and is also guided by a bushing carried by an internal lug 36 of the casing. A coil spring 38 interposed between the top of the casing and an adjusting nut 40 threaded on the shaft tends to lower the shaft and so make the lower ball 8 move against the raceway. To first permit the placing of the race ring over the balls, the shaft is elevated by means of a knurled head 42 and then locked by a pin 44 projecting from the shaft into a bayonet slot of a knurled sleeve or collar 46 which is supported on the top of the casing and rotatable part way around the shaft to engage the pin.

As shown by broken lines in Fig. 2, the race ring 4 is centered horizontally with respect to the balls by a pair of arms 48, each projecting forwardly from a split hub 50 which is clamped to a horizontal stud 52 carried by a side of the vertical plate 20. The plate is vertically bored to guide a pair of rods 54 which have their lower ends pinned to a bar 56 which is connected to the movable lug 26 by a screw bolt 58. The rods 54 are fixed at their upper ends to a collar 60 carrying an indicator 61 having its stem 62 resting on a lug 64 carried in a notch of the vertical plate 20 and held in place by a pin 66 which projects down into a hole in the plate. Since lug 64 and gauge stem 62 are fixed with respect to the main casing 24, the indicator and its collar 60 move vertically in response to a gauging movement of the lower ball 8, receiving their motion with the guide rods 54, bar 56 and lug 26. Hence the diameter of the race will be indicated by the dial reading and the diameter of the race will also determine the vertical position of the sliding shaft 32. Such position of the shaft is made to make a preliminary setting of a pair of contact members which control the grinding to size of an inner race ring or cone 70 (Fig. 5). For instance, if the cup 4 is internally smaller than average, it should have an externally smaller cone which means that the grinding of the cone should continue longer. Hence the contacts are set by the cup in a preliminary position farther from a controlling finger actuated by the cone being ground. Cups and cones are thus matched to fit balls of a given diameter and only the cone needs to be accurately sized.

The sliding shaft 32 has a notch at the rear in which is secured a bar 72 which carries a ball or hardened bearing point overlying a horizontal lug 74 on a plate 76 which is secured to a floating block 78. The shaft 32 will slide down as far as the race ring or cup 4 will permit and the floating block will take a corresponding position because the lug 74 is kept pressed upwardly against the overlying bar 72 by a coiled expansion spring 80 (Fig. 8) which is interposed between a lug on the plate 76 and a pilot screw 82 fastened in a vertical position at the bottom of the casing 24. The floating block 78 is supported by a pair of thin horizontal springs 84 attached to a block 86 screwed to the inside of the casing. The ends of the springs are set in channels of blocks 88 which are clamped in recesses of the blocks 78 and 86. The blocks 78 and 86 have vertical channels at their upper ends in which are secured the lower ends of thin vertical springs 90. The springs 90 have their upper ends offset rearwardly and rigidly connected although spaced by an interposed layer of insulation 92. A pair of vertical contact fingers or spring plates 94 and 96 have their lower ends offset forwardly and rigidly secured to the upper ends of springs 90 although suitable thin layers of insulation, such as fish paper, are interposed. Wires 98 and 100 lead from a source of current to terminal tabs 99 on the plates 94 and 96. Contact buttons 102 and 104 on the plates 94 and 96 are normally in contact with one another to keep closed a circuit which controls the fine cross feed of a grinding wheel G which is operating on the cone 70. Such feed control is common in the art of grinding machines, the breaking of the circuit stopping the feed as by de-energizing a magnet which controls a pawl.

It will be noted that the diameter of the previously ground cup determines the vertical position of the floating block 78 and that relative longitudinal displacement of the springs 90 will cause a magnified lateral displacement of their upper ends and a joint tilting of the plates 96 and 94 to one side or the other from a normal position. For instance, a cup 4 which is smaller internally than the average allows the floating block 78 to take a higher position to effect a tilting of the plates 96 and 94 to the left as shown in Fig. 4. This moves the plates farther away from a circuit breaking finger whose movement to the left is controlled by the size of the cone being ground and of course such cone should be externally smaller to match the internally smaller cup. Grinding of the cone should continue longer therefore and the increased preliminary displacement of plates 94 and 96 postpones the time of shutting off the feed which is controlled by separating the contact buttons 102 and 104. The plate 94 carries an insulated projection 106 in a position to be engaged by a finger 108 to break the circuit. The finger 108 is movable in response to the decreasing diameter of the cone being ground as will appear.

Finger 108 is clamped by plates 110 to the upper ends of springs 112 whose lower ends are secured to blocks 114 and 116, the block 114 being fastened to the inside of an extension casing 118 which is secured to and complements the casing section 24. Block 116 is a vertically floating block supported by parallel springs 120 from the fixed block 114. It will be noted that blocks 114 and 116 are in the rear casing at the rear of blocks 78 and 86 and that the rear set of blocks is arranged with the floating block on the left whereas the front set has the floating block on the right. It will also be noted that springs 112 are substantially central with respect to the casing whereas springs 90 are located to the left side of the center and also offset rearwardly at their upper ends to locate the plates 94 and 96 in the rear housing section 118 where the finger 108 can engage the projection 106. Floating block 116 carries a plate 122 having a horizontal lug 124 capable of engaging a ball or hardened point on the under side of a block 126 which is clamped in a groove of a vertically slidable shaft 128. A coiled expansion spring 129, interposed between a lug 130 of plate 122 and a pilot screw 132 (Fig. 1), presses the floating block upwardly and so tends to flex the springs 112 to the right as indicated in Fig. 4. The lower end of the slidable shaft 128 carries a headed stud 133 (Fig. 1) with a gauge point 134 riding on the raceway of the cone 70 which is being ground. A coil spring 136 (Fig. 5) engaging a nut 138 on the shaft makes the shaft follow down as the cone is ground away. The shaft is suitably guided through the casing, and its lower bearing is shielded by a flexible sleeve 139. The upper end of the shaft has a knurled head 140 and a locking collar or sleeve 142 with a bayonet slot 144 to engage a shaft pin 146. The shaft can thus be held away from the cone prior to starting the grinding and gauging operation. When the locking pin 146 is released, the shaft will move down as far as the unground cone permits.

Initially, the floating block 116 is held up by the spring 129 and so moves the finger 108 laterally into engagement with an insulated projection 148 on a spring 150 thereby holding a contact button 152 of spring 150 out of contact with a co-operating button 154 on a spring 156. The springs have their lower ends laterally offset and electrically insulated from one another and from the casing 118 by insulating plates 160 and insulating bushings carried by screws 161 which secure the assembled structure to the side wall of the casing 118. A terminal flap 162 on spring 156 is connected to the wire 100 and a terminal flap 164 on spring 150 is connected to a wire 166. These wires are in circuit with any suitable electrical device which will change the cross feed of the grinding wheel from coarse to fine upon contact of button 152 with button 154. The circuit remains open and coarse feed continues until the block 126 engages the lug 124 of the floating block 116 and thereafter moves the finger 108 far enough to the left to release the spring 150 thereby letting the button 152 move towards the button 154.

The space between the buttons can be regulated, to postpone the time of changing feed, by a screw 168 having an insulating projection 170 which passes through a slot 172 (Fig. 8) in spring 150 to engage and hold the spring 156 further to the left in Figs. 1, 4 and 8. The springs 150 and 156 are initially tensioned to move towards each other to bring their contact buttons into engagement. Coarse feed grinding of the cone will thus continue until the finger 108 entirely releases the spring 150 and the resulting completion of the circuit through the wires 100 and 166 changes the feed from coarse to fine. Such shift of feed is common in the art of grinding, as by having the circuit energize a magnet to lift a coarse feed pawl. There is then an interval of fine feeding which occurs while the finger 108 continues to move to the left to engage the insulating projection 106. This is a comparatively large amplitude of movement of the finger 108 but it represents only a very small lowering movement of the gauge shaft and a corresponding small reduction in size of the cone. Great multiplication in the movement of the upper end of finger 108 is effected by the relative longitudinal movement of the springs 112 which are thin and close together in substantially parallel relation. Plates 96 and 156 carry insulating bumpers 174 for the finger 108. The gauge casing section 118 is provided at one side with an undercut groove 176 forming a slideway for supporting it adjustably on a tongue of the grinding machine.

I claim:

1. In apparatus for controlling the grinding to size of one of a pair of mating articles, a pair of contact members for establishing an electric circuit, gauging means co-operating with a finished article of a pair for locating said contact members in a preliminary position depending on the size of the finished article, a finger for moving one of said contact members with respect to the other to control the circuit, and gauging means co-operating with a mating article being ground for moving said finger towards said movable contact member in accordance with the changing size of the mating article; substantially as described.

2. In apparatus for controlling the grinding to size of one of a pair of mating articles, a pair of contact members for establishing an electric circuit, spring plates carrying said contacts, gauging means co-operating with a finished article of a pair for locating said spring plates in a preliminary position depending on the size of the finished articles, a finger for moving one of said spring plates to control the circuit, and gauging means co-operating with a mating article being ground for moving said finger towards said movable spring plate in accordance with the changing size of the mating article; substantially as described.

3. In apparatus for controlling the grinding to size of one of a pair of mating articles, a pair of contact members for establishing an electric circuit, gauging means co-operating with a finished article of a pair for locating said contact members in a preliminary position depending on the size of the finished article, a second pair of contact members for establishing a second electric circuit, a finger between said pairs of contacts, and gauging means co-operating with a mating article being ground for moving said finger to successively control the electric circuits; substantially as described.

4. In apparatus for controlling the grinding of an article, a pair of contact members for establishing an electric circuit, a second pair of contact members for establishing a second electric circuit, one contact member of each pair being movable with respect to the other, a finger between said pairs of contact members and adapted to control the movable contact members, and gauging means co-operating with an article being ground for moving said finger from one movable contact member to the other to successively control the circuits; substantially as described.

5. In apparatus for matching pairs of articles, a movable member, gauging means co-operating with one article of a pair for locating said movable member in a preliminary position depending on the size of the article, a finger mounted to move towards said movable member, and gauging means co-operating with the other article of the pair for moving said finger towards said movable member a distance depending on the size of said other article; substantially as described.

6. In apparatus for matching pairs of articles, a casing, a member movable in the casing, gauging means connected to the movable member and having contact with one article of a pair to locate said movable member in accordance with the size of the article, a finger in said casing, and gauging means connected to the finger and having contact with the other article of the pair to move said finger a distance depending on the size of said other article; substantially as described.

7. In apparatus for matching pairs of articles, a casing, a shaft guided by the casing, article engaging means connected to the shaft, a movable member actuated by the shaft to a position determined by the size of the article, a second shaft guided by the casing and having contact with a mating article, a movable member actuated by the second shaft to a position determined by said mating article, and mechanism whereby the relative positions of said movable members controls the operation of bringing the articles to a desired size relation to one another; substantially as described.

8. In a gauging apparatus, a casing, article locating means fixed to the casing, a movable indicator having a stem engaging the casing, movable means for engaging an article, and guide rods connecting the movable means to the indicator to move the latter with respect to its stem; substantially as described.

9. In apparatus for matching pairs of articles, a casing, shafts guided by the casing, means connected to each shaft for engaging one article of a pair, movable members in the casing and each actuated from one of the shafts to a position determined by the size of the corresponding article, and one of said movable members being arranged in co-operative relation to the other whereby the space between them is related to the difference in size of the mating articles; substantially as described.

10. In apparatus for matching pairs of articles, a casing, shafts guided by the casing, means connected to each shaft for engaging one article of a pair, movable members in the casing and each actuated from one of the shafts to a position determined by the size of the corresponding article, one of said movable members being arranged in the path of the other, means urging each shaft in a direction to cause the article engaging means to press against the article, and means for locking each shaft in a retracted position with the article engaging means out of engagement with the article; substantially as described.

11. In apparatus for matching pairs of articles, a casing, a pair of movable members in the casing, means projecting from the casing to engage one article of the pair and having connection with one of said members to move it to a position determined by the size of said one article, means projecting from the casing to engage the mating article and having connection with the other movable member to move it to a position determined by the size of the mating article, one of said movable members being arranged in the path of the other, and means whereby the relative spacing of the members controls the operation of bringing one article to a desired size relation to the other; substantially as described.

12. In apparatus for matching pairs of articles, a casing in two sections, a shaft guided by one section of the casing, means connected to the shaft for engaging one article of a pair, a movable member actuated from the shaft to a position determined by the size of the article, a second shaft guided by the other section of the casing, means connected to the second shaft for engaging the mating article, a movable member actuated by the second shaft to a position determined by the size of said mating article, one of said movable members having a part offset from one casing section to bring it into the other casing section for operation by the shaft, and means whereby the relative spacing of said members controls the operation of bringing the mating article to a desired size relation with respect to the first article; substantially as described.

13. In apparatus for matching pairs of articles, a casing in two sections, a pair of movable members in one section of the casing and arranged one in the path of the other, means projecting from said one casing section for engaging one article of a pair and for controlling movement of one of the members to a position determined by the size of the article, the other movable member having a part offset into the other casing section, means projecting from said other casing section for engaging the mating article, said means controlling said offset part to move the other movable member to a position determined by the size of the mating article, and means whereby the relative spacing of the members controls the operation of bringing one article to a desired size relation to the other; substantially as described.

In testimony whereof I hereunto affix my signature.

FREDERICK G. HUGHES.